United States Patent
Koguchi et al.

(10) Patent No.: US 9,697,642 B2
(45) Date of Patent: Jul. 4, 2017

(54) IMAGE PROCESSING DEVICE AND IMAGE PROCESSING METHOD

(71) Applicant: Sony Computer Entertainment Inc., Tokyo (JP)

(72) Inventors: Takahiro Koguchi, Tokyo (JP); Masaaki Oka, Kanagawa (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 43 days.

(21) Appl. No.: 14/441,948

(22) PCT Filed: Nov. 19, 2012

(86) PCT No.: PCT/JP2012/007414
§ 371 (c)(1),
(2) Date: May 11, 2015

(87) PCT Pub. No.: WO2014/076744
PCT Pub. Date: May 22, 2014

(65) Prior Publication Data
US 2015/0317826 A1    Nov. 5, 2015

(51) Int. Cl.
*G06T 15/80*    (2011.01)
(52) U.S. Cl.
CPC .................................... *G06T 15/80* (2013.01)
(58) Field of Classification Search
CPC ....... G06T 15/506; G06T 15/50; G06T 15/60; G06T 15/80; G06T 15/06
See application file for complete search history.

(56) References Cited

U.S. PATENT DOCUMENTS 6,088,486 A * 7/2000 Yamaguchi ............... G06T 3/40
  375/E7.078
6,563,999 B1   5/2003 Suzuoki
(Continued)

FOREIGN PATENT DOCUMENTS

CN    102024269 A    4/2011
JP    06-342465 A    12/1994
(Continued)

OTHER PUBLICATIONS

Office Action for corresponding CN Application No. 201280077009.1, pp. 32, dated Oct. 9, 2016.
(Continued)

*Primary Examiner* — Todd Buttram
(74) *Attorney, Agent, or Firm* — Matthew B. Dernier, Esq.

(57) ABSTRACT

In an image processing device, an information processing section performs information processing according to an instruction input by a user. An alpha buffer generating block of an image processing section generates an alpha buffer representing, in an image plane, the alpha value of each pixel when designated objects formed by a plurality of objects are collectively regarded as one object. A rendering block reads each piece of model data from an image data storage section, and renders an image also including other objects than the designated objects. A shading processing block approximately calculates degrees of occlusion of ambient light on the image plane, and subjects the rendered image to shading processing on a basis of a result of the calculation.

8 Claims, 11 Drawing Sheets

(56) References Cited

U.S. PATENT DOCUMENTS

| | | | |
|---|---|---|---|
| 6,720,976 B1 | 4/2004 | Shimizu | |
| 8,217,949 B1* | 7/2012 | Carpenter | G06T 5/002 345/419 |
| 9,001,124 B2 | 4/2015 | Engel | |
| 2003/0179197 A1* | 9/2003 | Sloan | G06T 15/506 345/426 |
| 2008/0018647 A1* | 1/2008 | Bunnell | G06T 13/00 345/426 |
| 2009/0309877 A1* | 12/2009 | Snyder | G06T 15/60 345/426 |
| 2011/0069069 A1* | 3/2011 | Engel | G06T 15/60 345/426 |

FOREIGN PATENT DOCUMENTS

| | | |
|---|---|---|
| JP | 6342465 A | 12/1994 |
| JP | 9330422 A | 12/1997 |
| JP | 2000149053 A | 5/2000 |
| JP | 2002015311 A | 1/2002 |
| JP | 2004180173 A | 6/2004 |

OTHER PUBLICATIONS

Lei Ma "Real-Time Rendering of Deformable Transparent Object" Chinese Master's Theses, Collections of Science and Technology, vol. 2011, No. 1, 17 pages, (Jan. 15, 2011) (for relevancy see Office Action for corresponding CN Application No. 201280077009.1, pp. 32, dated Oct. 9, 2016).

Wenyao Li, "Research on Ambient Occlusion Technology in an Interactive System" CMFD, Collections of Science and Technology, vol. 2011, No. 7, 13 pages, (Jul. 16, 2011) (for relevancy see Office Action for corresponding CN Application No. 201280077009.1, pp. 32, dated Oct. 9, 2016).

Jian Wang, "Research on Realistic Hair Rendering Algorithm" CMFD, Collections of Science and Technology, vol. 2011, No. 10, 5 pages, (Oct. 15, 2011) (for relevancy see Office Action for corresponding CN Application No. 201280077009.1, pp. 32, dated Oct. 9, 2016).

Xingzhe, Piao et al., "Depth peeling-based Screen-Space Ambient Occlusion Algorithm" Journal of Shenyang Institute of Technology vol. 31, No. 6., 8 pages, (Dec. 31, 2009) (for relevancy see Office Action for corresponding CN Application No. 201280077009.1, pp. 32, dated Oct. 9, 2016).

Morgan McGuire et al. "The Alchemy Screen-Space Ambient Obscurance Algorithm" Proceedings of ACM SIGGRAPH/ Eurographics High-Performance Graphics 2011, 7 pages, (Aug. 7, 2011).

International Preliminary Report on Patentability and Written Opinion for corresponding JP Application No. PCT/JP2012/007414, pp. 1-8, dated Jun. 18, 2015.

International Search Report for corresponding JP Application No. PCT/JP2012/007414, dated Jan. 8, 2013.

Tokoi Kenkyushitsu Nov. 22, 2010 (22 .11. A 2010), [Open GL] [GLSL]SSAO(Screen Space Ambient Occlusion), [online], [published on Dec. 8, 2010, 17 pages, Internet <URL :http://marina.sys. wakayama-u.ac.jp/~tokoi/?date=20101122> (for relevancy see International Search Report for corresponding JP Application No. PCT/JP2012/007414, dated Jan. 8, 2013).

* cited by examiner

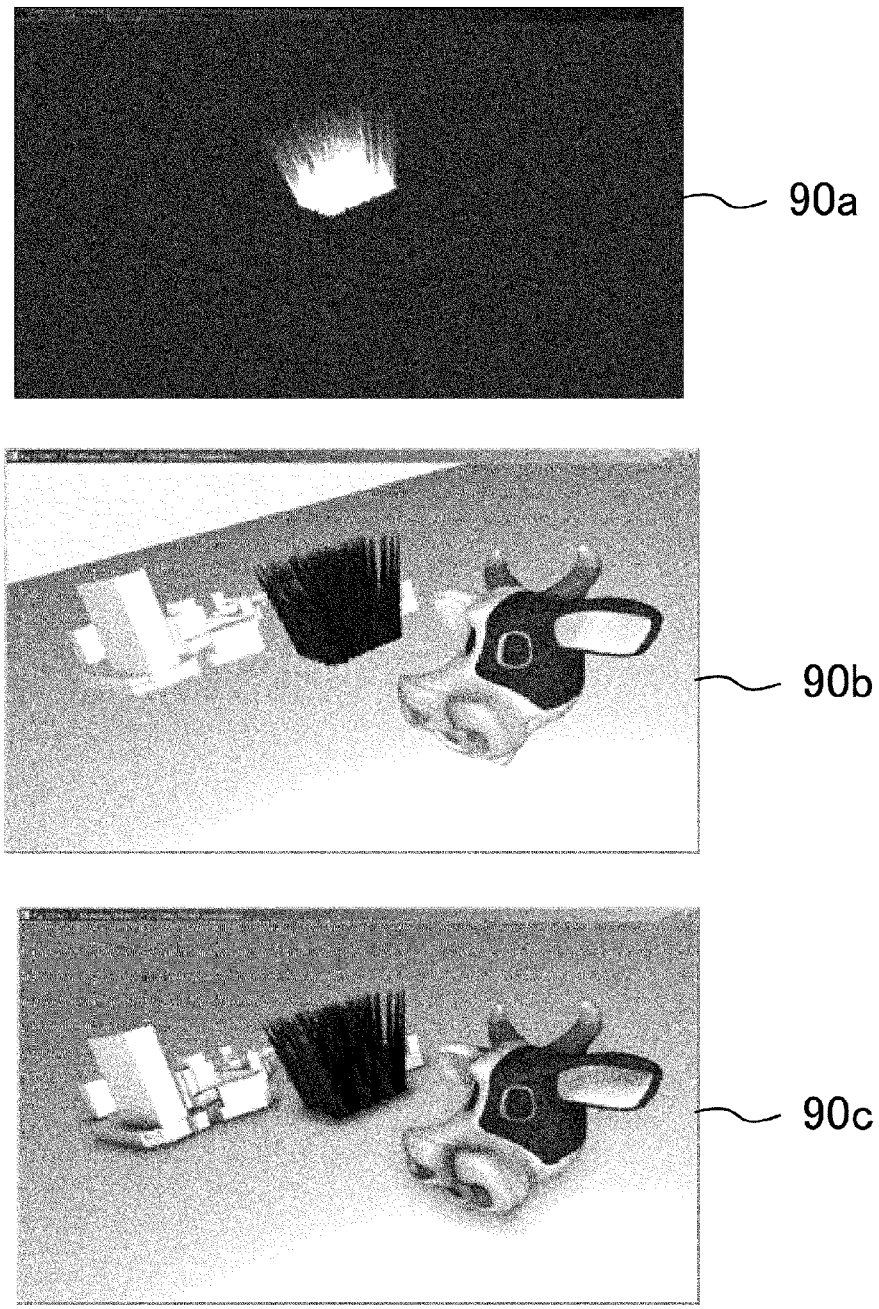
F I G. 6

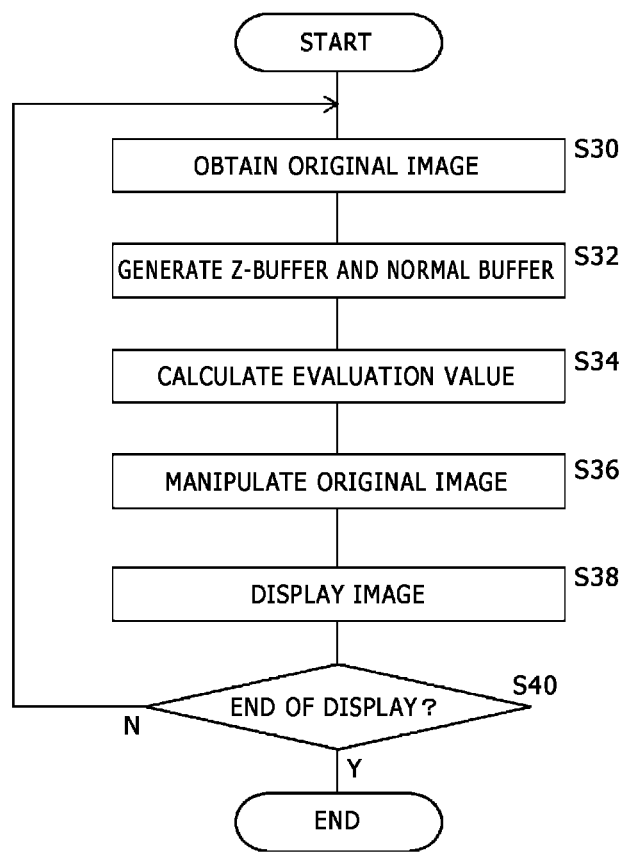

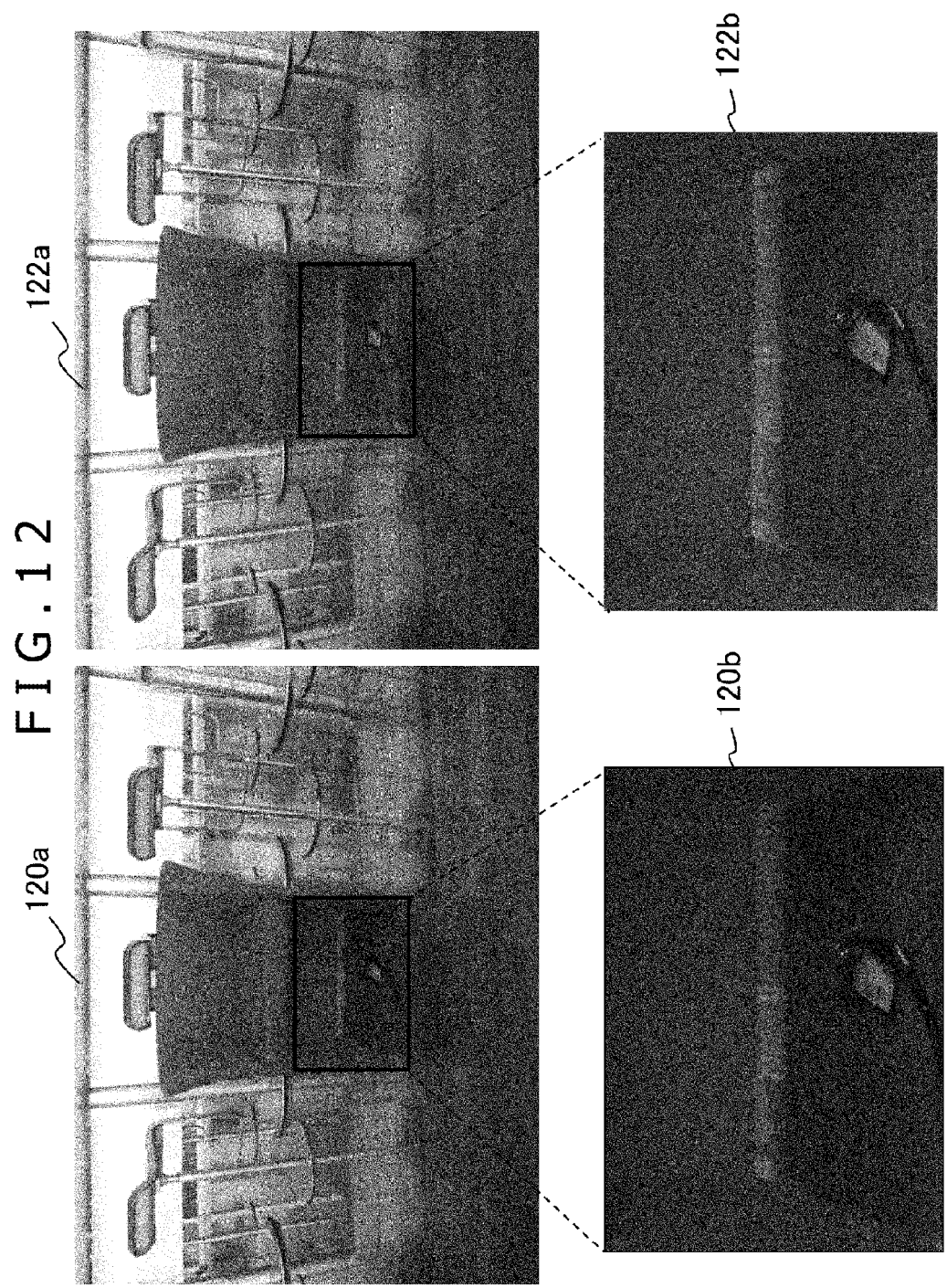

IMAGE PROCESSING DEVICE AND IMAGE PROCESSING METHOD

TECHNICAL FIELD

The present invention relates to an image processing device that renders an image or manipulates a photographed image, and an image processing method used in the device.

BACKGROUND ART

An entertainment system for home use that not only executes a game program but also can reproduce a moving image has been proposed. In this entertainment system for home use, a GPU generates three-dimensional images using polygons (see Patent Literature 1, for example). At this time, alpha values indicating transparency are set to objects to be rendered, and objects having transparency can be expressed by alpha blending processing that superimposes the objects in order beginning with an object in the rear as viewed from a viewpoint in consideration of the alpha values at a time of rendering.

In addition, it has become possible to easily perform various manipulation processing on not only three-dimensional images rendered by a device but also images photographed by a camera or the like on the basis of user operations and device settings. In such an environment, the efficiency and responsiveness of image generation are always important problems. Therefore, various technologies such as image data compression technologies, transmission technologies, image processing technologies, display technologies, and the like have been developed and put to practical use in many fields. It has thus become possible to enjoy high-definition images nearby in various situations.

CITATION LIST

Patent Literature

[PTL 1] U.S. Pat. No. 6,563,999

SUMMARY

Technical Problem

The higher the definition of an image is, and the more complex the display contents are, the more a load of processing required for rendering and manipulation is increased, and thus the more evident problems of operability and responsiveness tend to become. For example, when a large number of minute objects are to be expressed precisely, the processing load is increased to perform correct alpha blending processing. Therefore, depending on the processing power of the device, responsiveness can be degraded, or image quality can be reduced. There is thus a need for a technology capable of invariably generating or displaying high-definition images in any device environment.

In addition, when a photographed image or a rendered image is manipulated, a region to be manipulated, such as the whole of the image, a rectangular region in a part of the image, or the like, is typically determined on the basis of an image plane. In this case, consideration is not given to the contents themselves of the image. Thus, depending on a purpose of the manipulation, even an originally unintended region may be manipulated additionally, or a boundary between a manipulated region and another region may become conspicuous. There is thus a need for a technology for easily performing image manipulation that produces a natural processing result in which the structure of a space including a person or an object expressed in an image is taken into account.

The present invention has been made in view of such problems. It is an object of the present invention to provide an image processing technology that can perform image rendering and image display with good responsiveness even when the image is a high-definition image. It is another object of the present invention to provide an image processing technology that can easily perform image manipulation that produces a natural processing result.

Solution to Problem

A mode of the present invention relates to an image processing device. The image processing device is an image processing device for rendering an image including an object to which an alpha value indicating transparency is set, the image processing device including: a rendering block rendering, in an image plane, the object in a space to be rendered according to a viewpoint; and a shading processing block obtaining a distribution of evaluation values of degrees of occlusion, the evaluation values being able to be calculated by estimating the degrees of occlusion of ambient light in the space to be rendered, for an image rendered by the rendering block, shading the rendered image on a basis of the distribution, and storing resulting data in a memory.

Another mode of the present invention relates to an image processing method. The image processing method is an image processing method of an image processing device rendering an image including an object to which an alpha value indicating transparency is set, the image processing method including: a step of rendering, in an image plane, the object in a space to be rendered according to a viewpoint after reading model data of the object from a storage device; a step of obtaining a distribution of evaluation values of degrees of occlusion, the evaluation values being able to be calculated by estimating the degrees of occlusion of ambient light in the space to be rendered, for a rendered image; a step of shading the rendered image on a basis of the distribution of the evaluation values; and a step of storing data of the shaded image in a memory.

Yet another mode of the present invention relates to an image processing device. This image processing device includes: a buffer obtaining section obtaining, on a basis of information about position coordinates in a depth direction of a target object expressed in an image with respect to an image plane, a Z-buffer indicating a distribution of the position coordinates in the image plane; a projection and depression evaluating section obtaining a distribution of evaluation values approximately representing a degree of a depression or a projection of a surface shape of the target object in a three-dimensional space, the degree of the depression or the projection being with respect to surroundings, by calculating the evaluation values for respective positions in the image plane using the Z-buffer; and an image manipulating section extracting a partial region of the original image on a basis of the distribution of the evaluation values, subjecting the region to a predetermined manipulation, and storing resulting data in a memory.

Yet another mode of the present invention relates to an image processing method. This image processing method is an image processing method of an image processing device manipulating an original image read from a memory, the image processing method including: a step of obtaining, on a basis of information about position coordinates in a depth direction of a target object expressed in the original image with respect to an image plane, a Z-buffer indicating a distribution of the position coordinates in the image plane; a step of obtaining a distribution of evaluation values approximately representing a degree of a depression or a projection of a surface shape of the target object in a three-dimensional space, the degree of the depression or the projection being with respect to surroundings, by calculating the evaluation values for respective positions in the image plane using the Z-buffer; a step of extracting a partial region of the original image on a basis of the distribution of the evaluation values, and subjecting the region to a predetermined manipulation; and a step of storing data of the image after the manipulation in the memory.

It is to be noted that arbitrary combinations of the above constituent elements as well as modes obtained by converting expressions of the present invention between a method, a device, a system, a computer program, and the like are also effective as modes of the present invention.

Advantageous Effects of Invention

According to the present invention, images of equal quality can be rendered and displayed with good responsiveness in any device environment. In addition, various image manipulations suited to needs can be performed easily.

BRIEF DESCRIPTION OF DRAWINGS

FIG. 6 is a diagram showing an example of transitions in an image generated in the first embodiment.

FIG. 11 is a flowchart of a processing procedure in which the image processing device manipulates an original image in the second embodiment.

FIG. 12 is a diagram showing a comparison between an original image photographed by a camera and an image manipulated by the second embodiment.

DESCRIPTION OF EMBODIMENTS

First Embodiment

Figure 1:
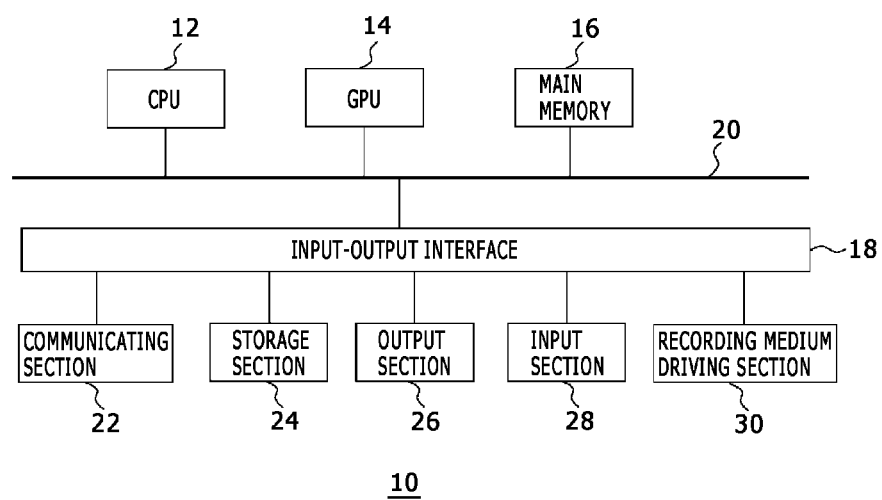
FIG. 1 is a diagram showing an internal circuit configuration of an image processing device according to a first embodiment.

FIG. 1 shows an internal circuit configuration of an image processing device according to a present embodiment. The image processing device 10 includes a CPU (Central Processing Unit) 12, a GPU (Graphics Processing Unit) 14, and a main memory 16. The CPU 12 controls signal processing and internal constituent elements on the basis of a program such as an operating system, an application, or the like. The GPU 14 performs image processing.

These parts are interconnected with each other via a bus 20. The bus 20 is further connected with an input-output interface 18. The input-output interface 18 is connected with a communicating section 22 including a peripheral device interface for USB, IEEE 1394, and the like and a network interface for a wired or wireless LAN, a storage section 24 such as a hard disk drive, a nonvolatile memory, and the like, an output section 26 that outputs data to output devices such as a display device, a speaker, and the like, an input section 28 that receives data from input devices such as a keyboard, a mouse, a game controller, a microphone, a camera, and the like, and a recording medium driving section 30 that drives removable recording media such as a magnetic disk, an optical disk, a semiconductor memory, and the like.

The CPU 12 controls the whole of the image processing device 10 by executing the operating system stored in the storage section 24. The CPU 12 also executes various kinds of programs read from the removable recording media and loaded into the main memory 16 or downloaded via the communicating section 22. The GPU 14 has a function of a geometry transfer engine and a function of a rendering processor. The GPU 14 performs rendering processing according to a rendering instruction from the CPU 12, and stores a display image in a frame memory not shown in the figure. Then, the GPU 14 converts the display image stored in the frame memory into a video signal, and outputs the video signal to the output section 26 or the like.

Figure 2:
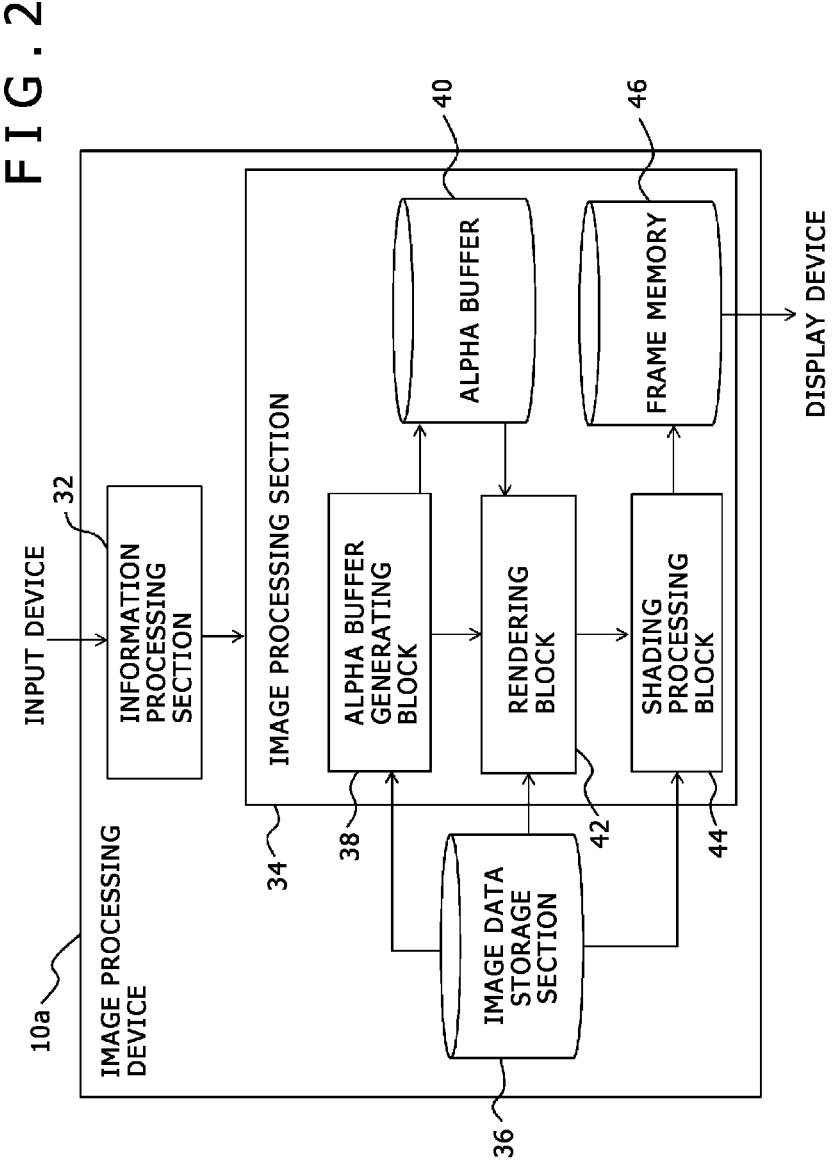
FIG. 2 is a functional block diagram of the image processing device according to the first embodiment.

FIG. 2 shows a functional block diagram of the image processing device 10. Elements described as functional blocks performing various processing in FIG. 2 and FIG. 10 to be described later can be configured by a CPU (Central Processing Unit), a GPU (Graphics Processing Unit), and a memory, or another LSI in terms of hardware, as described above, and are implemented by programs performing image processing and various kinds of operations or the like in terms of software. Hence, it is to be understood by those skilled in the art that these functional blocks can be implemented in various forms by only hardware, only software, or combinations of hardware and software, and are not to be limited to any one of the forms.

An image processing device 10a includes: an information processing section 32 that performs information processing according to an instruction input by a user; an image processing section 34 that performs image processing according to a request from the information processing section 32; and an image data storage section 36 that stores data necessary for the image processing. The information processing section 32 obtains information related to user operation from an input device such as the game controller, the keyboard, or the like, and performs information processing according to the information. Details of the information processing performed by the information processing section 32 are not particularly limited as long as the information processing involves image display, as in a game, the reproduction of a moving image, the reproduction of a still image, the viewing of a Web page, or the like.

In a case where a game is executed, for example, there may be a mode in which the user moves a viewpoint or produces some action by using an input device while viewing an image representing a virtual world which image is displayed on the display device. At this time, the information processing section 32 receives an input signal corresponding to details of an operation on the input device by the user, determines a change in the viewpoint or an object so as to correspond to the details of the operation, and requests the image processing section 34 to generate a display image. The processing performed by the information processing section 32 may be equivalent to processing performed by a CPU in an ordinary game device or an ordinary information processing device.

The image processing section 34 generates an image to be displayed on the display device according to the request from the information processing section 32. Basically, the image processing section 34 determines a coordinate system according to the viewpoint, and renders a display image accordingly, using the model data of each object and background image data that are stored in the image data storage section 36. The objects rendered in this case include objects having an alpha channel as color information. As is well known, when an object is rendered, matter having a transparency can be expressed by performing alpha blending using an alpha value (transparency) retained by the alpha channel.

In the present embodiment, for a designated plurality of objects, ordinary alpha blending is not performed, but transparency is expressed by simple processing using the alpha channel. The plurality of objects to be subjected to such processing or a group of the plurality of objects will hereinafter be referred to as a "designated object." The image processing section 34 includes: an alpha buffer generating block that generates an alpha buffer representing, in an image plane, the alpha value of each pixel when designated objects are collectively regarded as one object; an alpha buffer 40; a rendering block 42 that renders an image also including other objects than the designated objects; a shading processing block 44 that applies shading processing to the rendered image; and a frame memory 46 that stores the data of the image to be output to the display device.

When rendering objects include a designated object, the alpha buffer generating block 38 reads the alpha values of a plurality of objects belonging to the designated object from the image data storage section 36. Then, alpha values when these objects are collectively set as one object are calculated in an image plane, and written to the alpha buffer 40. Here, the designated object is designated in a program or a setting file by an image producer or the like.

For example, fine and dense objects such as hair or the like are easily made realistic by expressing the objects in a translucent manner. On the other hand, rendering the objects one by one while expressing transparency imposes a heavy processing load and thus degrades responsiveness as the amount of the objects is increased and as the number of overlaps is increased. Accordingly, the present embodiment reduces the load of the rendering processing by setting objects of such a nature as a designated object, and collectively generating one alpha buffer. In addition to hair, the present embodiment is effective especially for objects in a dense state, such as grass, leaves, moon jellyfish, or the like, which objects are desired to be expressed naturally while transparency is imparted to the objects. However, the present embodiment is not intended to be limited to such objects.

The rendering block 42 renders objects including a designated object according to a viewpoint notified from the information processing section 32. It suffices for this processing to be ordinary rendering processing that subjects a background and the objects to coordinate transformation according to the viewpoint and which projects the background and the objects onto a screen. Alpha blending processing may also be performed by an ordinary method. However, the alpha values of the designated object are set collectively by using the alpha buffer 40. Hence, order of rendering of objects belonging to the designated object is not specified.

The shading processing block 44 subjects the rendered image to shading processing, and outputs the result as a display image to the frame memory 46. While various methods of shading processing have been proposed, SSAO (Screen-Space Ambient Occlusion) as one of global illumination calculating methods, in particular, is used in this case. SSAO and another method may be combined with each other.

Figure 3:
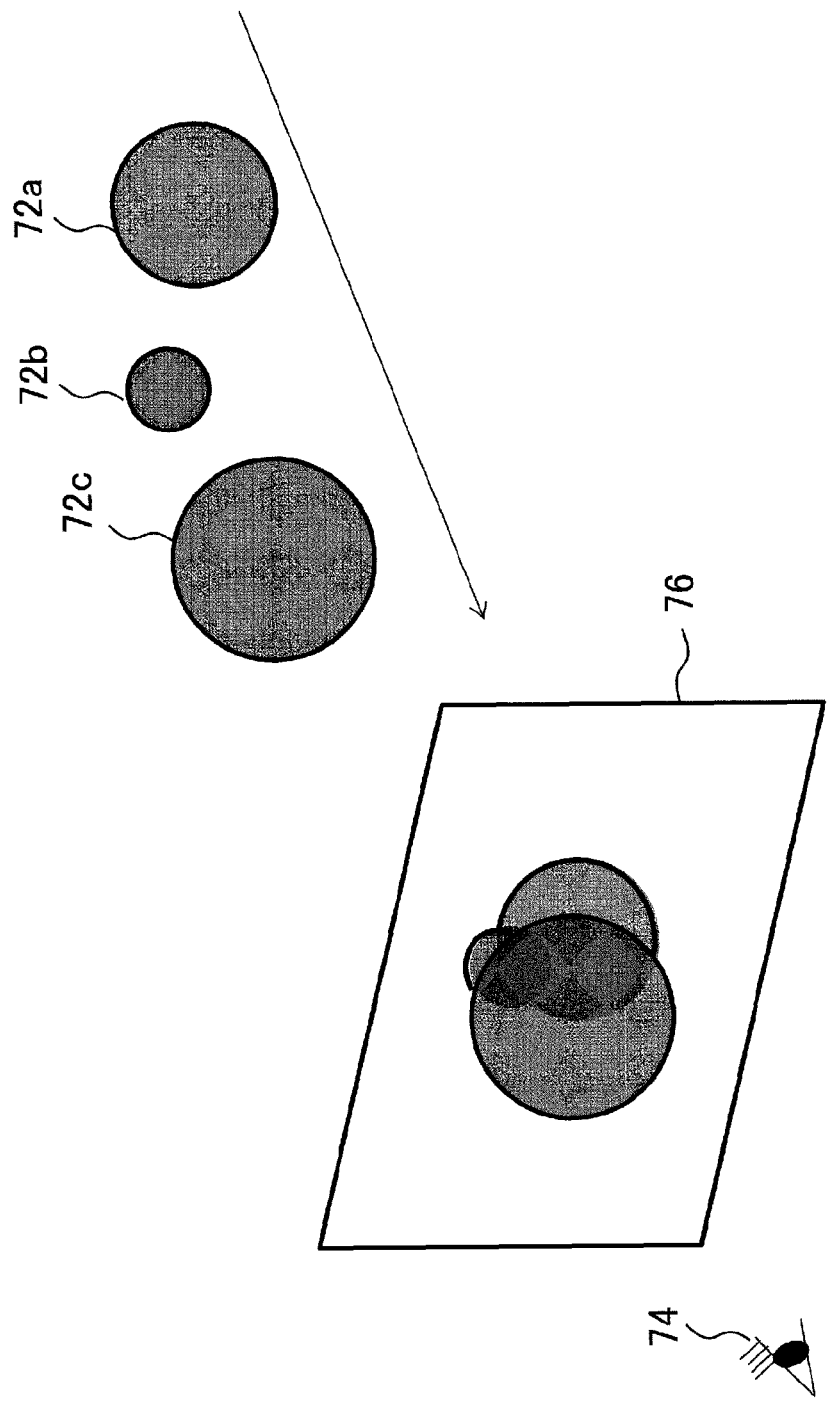
FIG. 3 is a diagram of assistance in explaining the processing of ordinary alpha blending.

FIG. 3 is a diagram of assistance in explaining the processing of ordinary alpha blending. First, suppose that three spherical objects 72a, 72b, and 72c are present in order of decreasing distance from a viewpoint 74 in a three-dimensional space. When the objects are projected onto a screen 76, a background is rendered first, and then the rearmost object 72a on the background, the middle object 72b, and the frontmost object 72c are rendered in this order. Letting Csrc be the set color of an object to be rendered, letting αsrc be an alpha value, and letting Cdst be the color of a pixel before rendering in a rendering region on the screen, the rendering color Cout of the object when each object has been rendered is calculated for each pixel as follows.

$$Cout = Csrc \cdot \alpha src + Cdst \cdot (1 - \alpha src)$$

That is, the rendering color Cout of the object is affected by the colors of the objects further to the rear and the background. Thus, as in the case of the screen 76 in FIG. 3, a part of the object 72a can be represented so as to be visible through the other two objects, and a part of the object 72b can be represented so as to be visible through the object 72c. On the other hand, when there is an error in the rendering order, the rendering color Cout is changed, so that a correct display image is not obtained.

Therefore, ordinary alpha blending processing needs sorting processing for obtaining correct order of arrangement of objects or polygons from a position distant from a viewpoint before rendering. However, particularly when dense objects such as hair or the like are rendered, the load of this sorting processing is increased. In addition, the front-rear relation of the root of a hair to another hair may be changed from that of the tip of the hair to the other hair. A situation can therefore occur in which representation cannot be made with each object sorted. Therefore, sorting in pixel units is also conceivable, but further increases the load of the processing.

Accordingly, in the present embodiment, as described above, an alpha buffer is generated en bloc for a plurality of objects belonging to a designated object, whereby the sorting processing can be omitted. When objects as shown in FIG. 3 are rendered, the alpha buffer generating block 38 calculates an alpha value for each pixel within a region in which the rendering regions of the three objects are combined with each other in the screen plane, and writes the alpha value to the alpha buffer. The alpha value αout of each pixel is obtained as follows.

$$\alpha out = 1 \Pi \alpha_k$$

Figure 4:
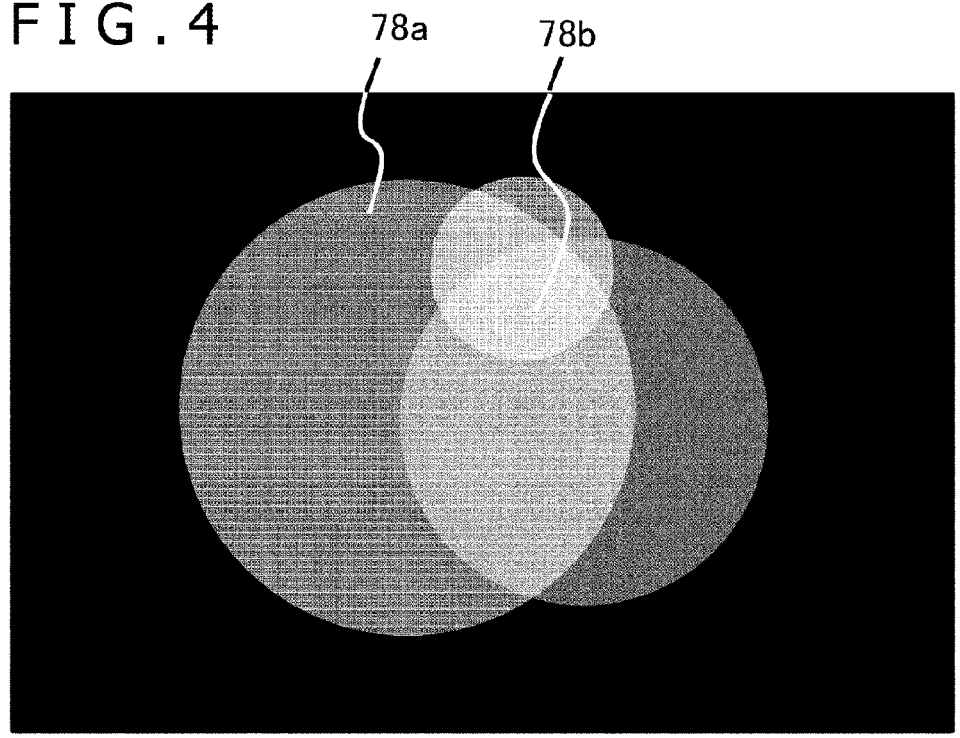
FIG. 4 is a conceptual diagram of an alpha buffer generated by an alpha buffer generating block in the first embodiment.

In this equation, $\alpha_k$ is the alpha value of an object whose rendering region covers the position of the target pixel, or when a plurality of objects are superimposed on the position of the target pixel, $\alpha_k$ is a set of the alpha values of these objects. FIG. 4 is a conceptual diagram of the alpha buffer generated by the alpha buffer generating block 38. Because the alpha value is in a range $0 \leq \alpha_k \leq 1$, the larger the number of superimposed objects, the more the total product on the right side approaches zero. As a result, the alpha value αout approaches one. That is, the larger the number of superimposed objects, the lower the transmittance. In addition, the result of the total product does not depend on order of the integration. Thus, sorting processing is not necessary even in the generation of the alpha buffer.

When the image of such an alpha buffer is expressed on a gray scale on which a maximum value represents white, as shown in FIG. 4, the image is such that a part where no other object overlaps is close to black (for example a region 78a) and a part becomes closer to white as the number of overlaps is increased (for example a region 78b). Incidentally, αout=0 outside the region of the designated object. When the rendering block 42 renders the designated object, the rendering block 42 renders each object without performing sorting processing, and as alpha values used at this time, always reads the values of corresponding pixels in the alpha buffer.

The shading processing performed by the shading processing block 44 will next be described. As described above, the technology of SSAO is adopted in the present embodiment. A concrete method of SSAO is described in detail in for example a non-patent document (The Alchemy Screen-Space Ambient Obscurance Algorithm, Morgan McGuire et. al., Proceedings of ACM SIGGRAPH/Eurographics High-Performance Graphics 2011 (HPG'11)).

SSAO is a method of approximately calculating the occlusion of ambient light by surrounding objects for each position on the screen plane onto which to project objects. In a real world, the larger the number of occluding objects in the surroundings, or the deeper a depression as a shape, the more the ambient light is occluded, thus increasing darkness. Therefore, a degree of the occlusion is converted into a numerical form by SSAO, and the image is shaded accordingly. In the present embodiment, the technology of SSAO is applied with attention directed to a fact that parts of low transmittance in the alpha buffer, that is, parts of dense objects are likely to coincide with parts with a high degree of occlusion according to SSAO.

Then, shade is produced so as to become gradually lighter from a part of a particularly high density such as the roots of hair or the like to a part of a relatively low density. Thus, a part whose transmittance is decreased and a part whose transmittance remains high in the above-described alpha buffer are represented with smooth changes in tone.

Figure 5:
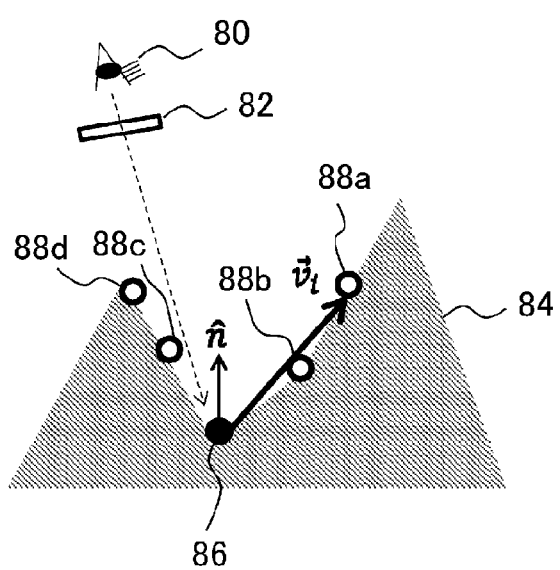
FIG. 5 is a diagram of assistance in explaining a calculation method of SSAO used in the first embodiment.

FIG. 5 is a diagram of assistance in explaining a calculating method of SSAO. First, consideration will be given to a case where an image is rendered by projecting an object 84 onto a screen 82 for a viewpoint 80. At this time, a normal buffer is generated which represents a normal vector in the three-dimensional space of the object 84 for each position of the object 84 in the screen plane, and a Z-buffer is generated which represents the positions of the object 84 in a direction of depth (depth direction) from the viewpoint in the screen plane. Then, a plurality of sample points 88a, 88b, 88c, 88d, . . . are generated on the object 84 by a predetermined rule for a target point 86 for which a degree of occlusion is desired to be obtained.

Incidentally, in the same figure, the sample points 88a, 88b, 88c, 88d, . . . are represented on the object 84 in the three-dimensional space. In actuality, however, the sample points 88a, 88b, 88c, 88d, . . . are generated on the screen plane. For example, a predetermined number of sample points may be randomly distributed within a circle having a predetermined radius with the target point 86 as a center, or may be normally distributed with a predetermined variance. Then, for each sample point, an inner product of a reference vector $v_i$ from the target point 86 to the sample point and a normal vector n at the target point 86 is calculated.

It can be said that the larger the value of the inner product, the steeper an acute angle formed between the normal vector n and the reference vector $v_i$, that is, the greater the contribution of the part of the sample point in the object 84 to the occlusion of the target point 86. A magnitude $S_i$ of contribution of an ith sample point to the occlusion can be actually calculated as follows.

$$S_i = \frac{\max(0, \vec{v_i} \cdot \hat{n} + z_c \beta)}{\vec{v_i} \cdot \vec{v_i} + \epsilon} \quad \text{[Math. 1]}$$

In this equation, a vector $v_i$ is a vector to the ith sample point, and a vector n is the normal vector of the target point. The former can be obtained from position coordinates in the three-dimensional space of each position on the surface of the object, which position coordinates are obtained from the Z-buffer. The latter can be obtained from the normal buffer. $Z_c$ is the position in the depth direction of the target point, which position is retained by the Z-buffer. That is, the last term of the numerator is introduced when changing the depth of shading according to a distance of the target object from the viewpoint, and β is a weighting coefficient that controls the degree of the effect. $S_i$ is obtained by normalizing the value of such an inner product by $v_i \cdot v_i$.

Incidentally, ε is a constant for preventing the denominator from becoming zero. Thus, a minute value is set as ε in advance. In addition, when the inner product assumes a negative value, the normal vector n and the reference vector $v_i$ form an obtuse angle, and thus the corresponding sample part does not contribute to the occlusion. Therefore $S_i$ has zero as a lower limit, as in the above equation. A degree of occlusion at the target point 86 is obtained by summing $S_i$ with respect to all of the sample points and obtaining an average value thereof. A evaluation value A that is in a range of zero to one and which approaches zero as the degree of occlusion is increased is expressed by the following equation.

$$A \approx \max\left(0, 1 - \frac{2\sigma}{s} \cdot \sum_{i=1}^{s} \frac{\max(0, \vec{v_i} \cdot \hat{n} + z_c \beta)}{\vec{v_i} \cdot \vec{v_i} + \epsilon}\right)^k \quad \text{[Math. 2]}$$

In this equation, s denotes the number of sample points, σ is a coefficient that determines the depth of shade to be given, and k is a parameter that determines the locality of the shade and which is adjusted as appropriate according to the contents of the image to be displayed or the like. The distribution of evaluation values A in the screen plane is obtained by performing similar calculation with all of pixels in the screen plane set as the target point. On the basis of the distribution, shading is applied such that a part with a smaller evaluation value A is provided with a deeper shade or is made to appear darker, for example. Such a method of SSAO enables a realistic image to be rendered at high speed.

FIG. 6 shows an example of transitions in an image generated in the present embodiment. In the present example, hair grown in a rectangular region, the character of a cow, and rectangular parallelepipeds are displayed as objects. First, after the alpha buffer generating block 38 identifies the model of an object of hair set as a designated object and the rendering position thereof, the alpha buffer generating block 38 creates an alpha buffer 90a. As described above, the larger the number of overlapping hairs in a part, that is, the higher the density, the larger the alpha value in the part, and therefore the part becomes closer to white when represented on a gray scale. In the case of hairs, the density of the hairs is increased at the roots of the hairs. Thus, as shown in the alpha buffer 90a, the part of the roots in particular is close to white.

Next, the rendering block 42 identifies the models of other objects and the rendering positions thereof, and renders the other objects together with the designated object. The rendering block 42 thereby generates an image 90b. Here, when the designated object is rendered, sorting processing is not performed as described above, but alpha blending with an already rendered background or an object is performed using the values of corresponding pixels in the alpha buffer 90a. An ordinary rendering method may be used for the other objects. The rendering block 42 also generates a normal buffer and a Z-buffer as described above at this time.

Next, the shading processing block 44 subjects the image 90b to shading processing. In this case, the normal buffer and the Z-buffer generated by the rendering block 72 are used, the distribution of evaluation values A is obtained by the above-described calculation, and the image is shaded on the basis of the distribution. Then, as in an image 90c, a realistic image is generated which shows shade that smoothly changes mainly in parts of depressions of the objects and edges of the objects which edges are in contact with a floor.

Figure 7:
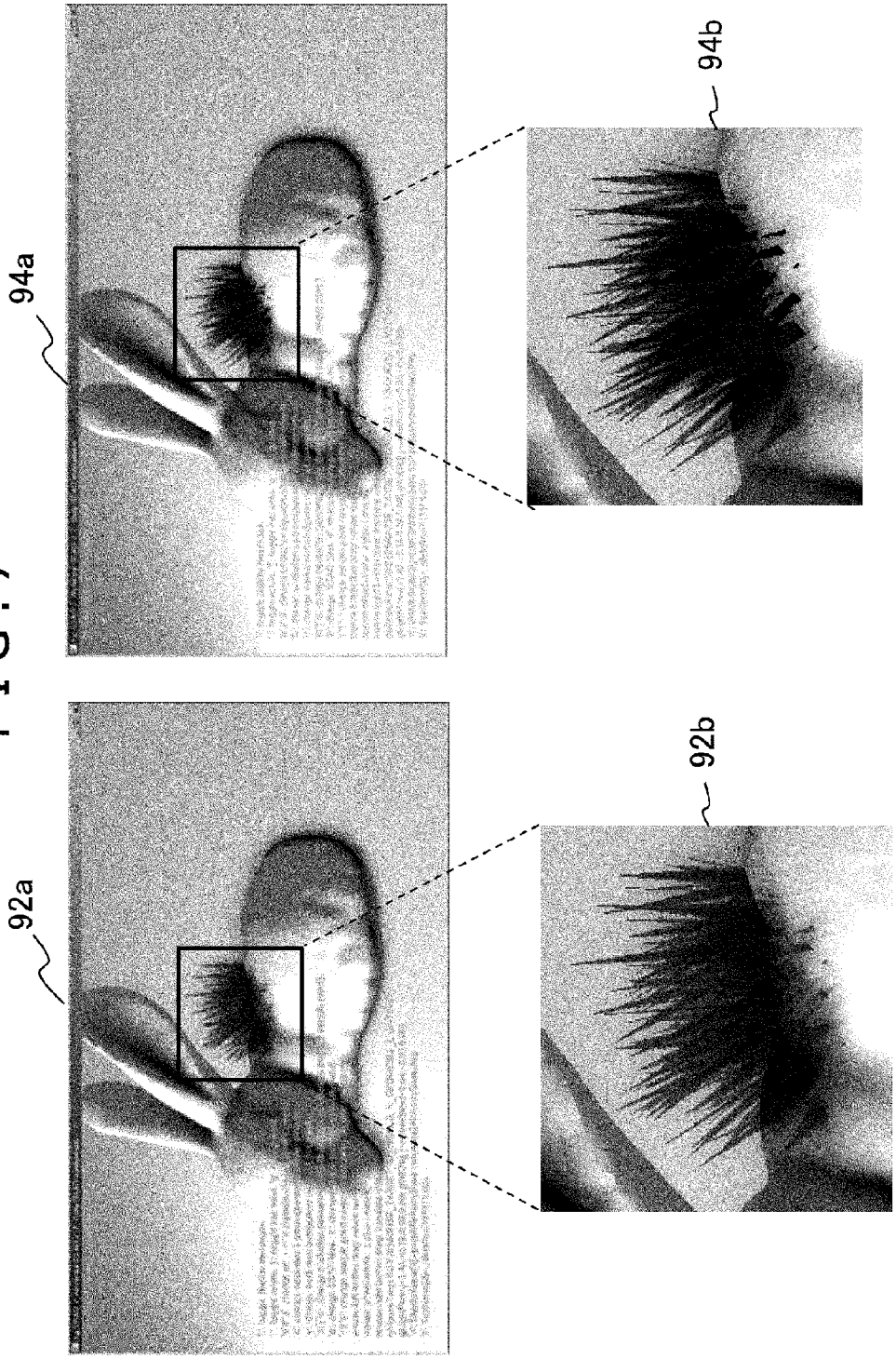
FIG. 7 is a diagram showing a comparison between an image obtained when objects including hair are rendered by the conventional technology and an image obtained when objects including hair are rendered in the first embodiment.
Figure 8:
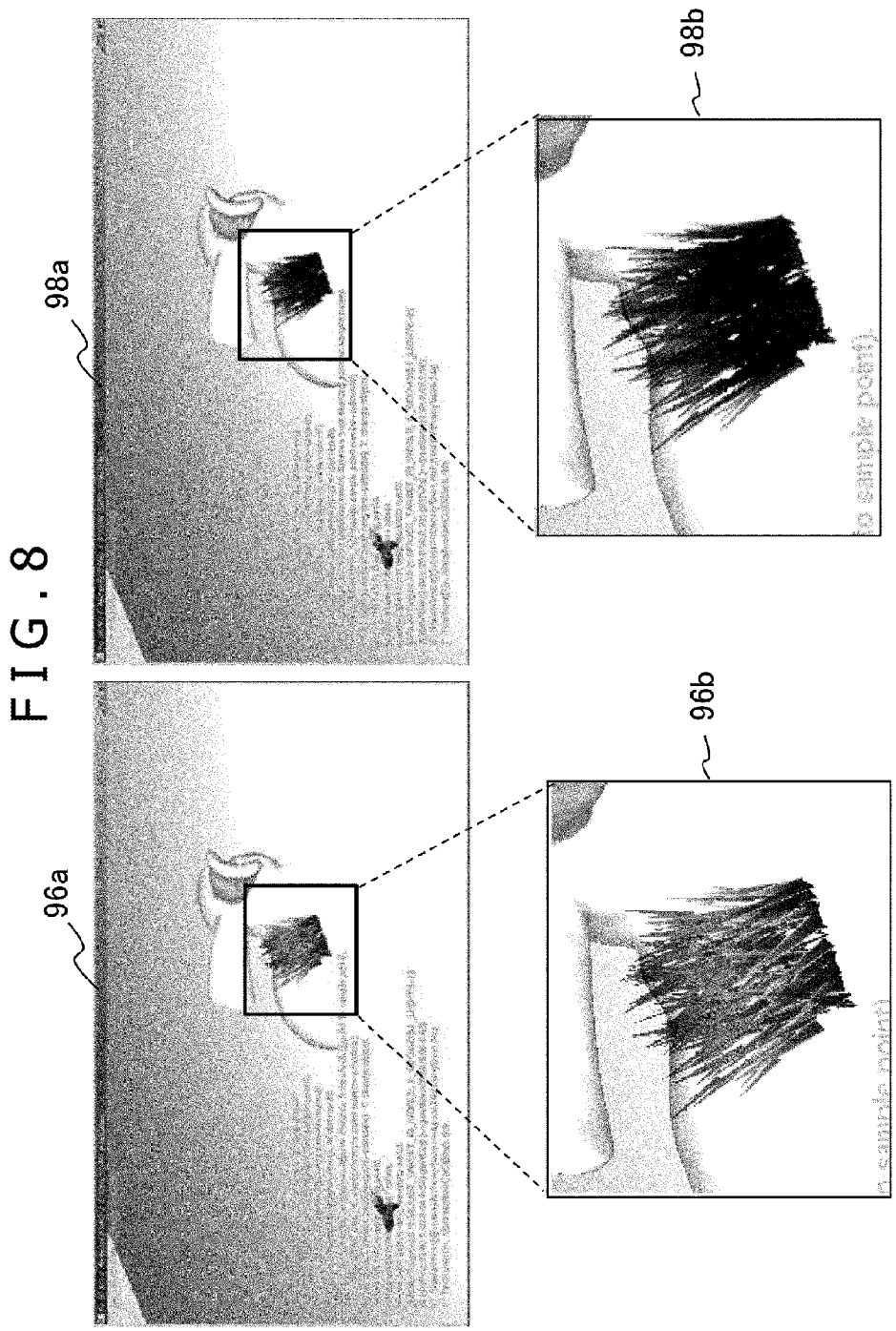
FIG. 8 is a diagram showing a comparison between an image obtained when objects including hair are rendered by the conventional technology and an image obtained when objects including hair are rendered in the first embodiment.

FIG. 7 and FIG. 8 show comparisons between an image obtained when objects including hair are rendered by the conventional technology and an image obtained when objects including hair are rendered in the present embodiment. In FIG. 7, an image 92a is rendered by sorting the objects of hairs by the conventional technology and then performing normal alpha blending in order of the sorted objects. On the other hand, an image 94a is rendered by the image processing device according to the present embodiment without performing a sort. Both of the images have been subjected to shading processing by SSAO.

A comparison between images 92b and 94b of magnified hair portions in the respective images 92a and 94a shows that the transparency of the image 94b rendered in the present embodiment is somewhat lost at the root portion of the hair, but the transparency is expressed more toward the tip portion of the hair. In addition, there are smooth changes from the root portion to the tip portion. It can be said that in such an object, transparency does not produce a great effect at the dense root portion in the first place due to the effect of shade and the like. As a result, the image 94b obtained by the method of the present embodiment gives an overall impression not so different from the image 92b for which sorting processing and alpha blending have been performed. That is, it is shown that even in a case of a large amount of fine objects, a natural image can be rendered without increasing a processing load.

An image 96a in FIG. 7 is rendered by performing alpha blending in wrong order without sorting the objects of hair in the conventional technology. An image 98a is rendered by the image processing device according to the present embodiment without performing a sort. Both of the images have been subjected to shading processing by SSAO. A comparison between images 96b and 98b of magnified hair portions in the respective images 96a and 98a shows that the image 98b rendered in the present embodiment represents a natural hair as described above.

On the other hand, in the image 96b in the case where conventional alpha blending is performed in the wrong order, the hair in the front which hair has been rendered first is not blended with the hair present in the rear, and the hair present in the rear is not rendered. Thus, as a whole, the image 96b is such that the background can be seen through the hair. That is, it is shown that under the same condition that sorting processing not be performed, the image provided by the present embodiment is of much higher quality.

Figure 9:
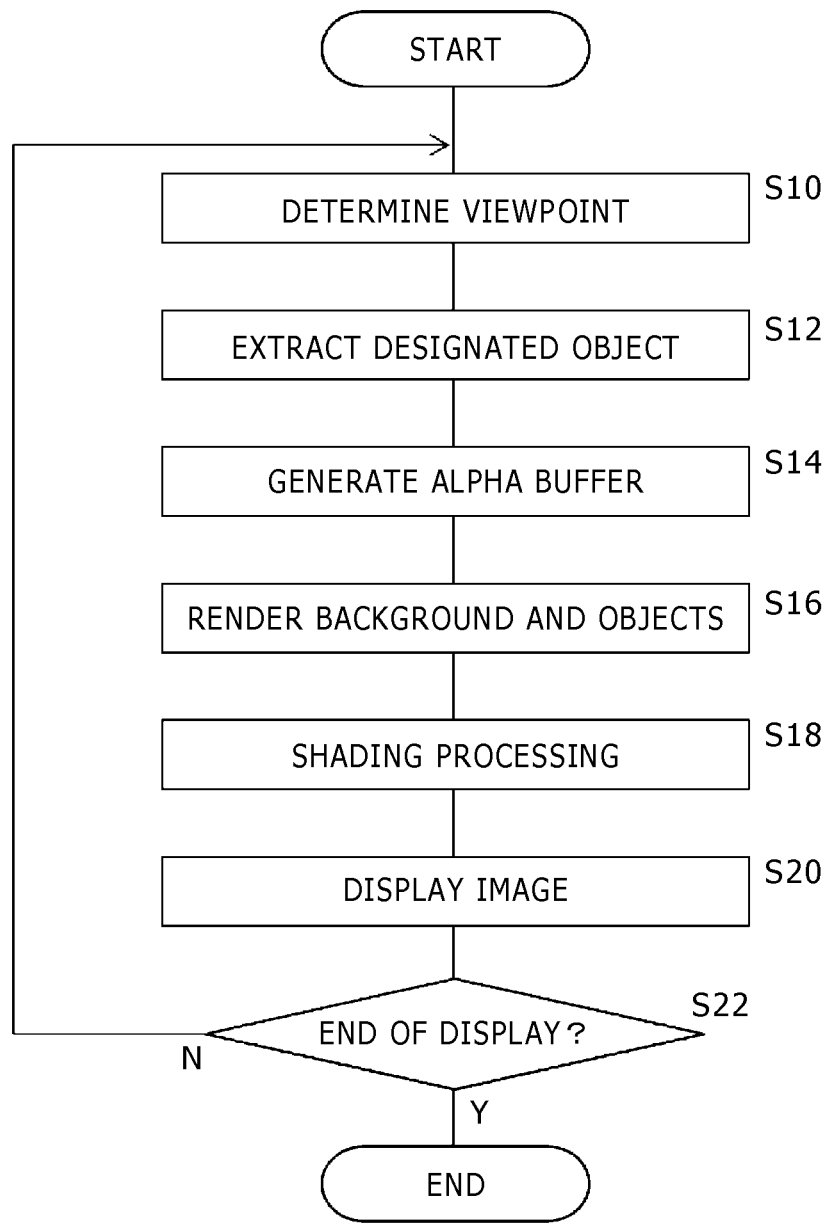
FIG. 9 is a flowchart of a processing procedure in which the image processing device generates a display image in the first embodiment.

The operation of the image processing device 10 realized by the configuration described thus far will next be described. FIG. 9 is a flowchart of a processing procedure in which the image processing device 10 generates a display image. This flowchart is started when the user gives the image processing device 10 an instruction input for starting information processing for a game or the like. First, the information processing section 32 determines a viewpoint in a three-dimensional space, and notifies the viewpoint to the image processing section 34 together with information on model data of objects to be rendered or the like (S10). The viewpoint immediately after the processing is started may be a viewpoint set in advance to display an initial image.

Next, the alpha buffer generating block 38 in the image processing section 34 reads the data of the objects to be rendered from the image data storage section 36, and extracts a designated object from the objects (S12). Then, as described above, an alpha buffer for the designated object is generated by integrating the alpha values of superimposed objects at the position of each pixel in a screen plane for the viewpoint, and subtracting the result from one (S14).

Next, the rendering block 42 renders the objects to be rendered including the designated object together with a background (S16). This processing may be ordinary rendering processing that projects the objects that have been subjected to coordinate transformation according to the viewpoint onto a screen plane, except for referring to the alpha buffer for the designated object. At the same time, a normal buffer and a Z-buffer are created. Next, the shading processing block 44 subjects the rendered image to shading processing (S18), and stores the image data in the frame memory 46 (S18). The image data is output to the display device in appropriate timing, whereby the image is displayed (S20).

Until the user performs an input for ending the display, or until a need to end the display arises after completion of the display to an end, for example (N in S22), the processing from S12 to S20 is repeated while the viewpoint is changed according to an operation by the user or a setting. Thereby image display changed according to the viewpoint is made. Then, when a need to end the display arises, the processing is ended (Y in S22).

According to the present embodiment described above, an alpha buffer is generated for a designated object including a plurality of objects having an alpha channel before the designated object is rendered. Then, at a time of rendering, the plurality of objects included in the designated object are rendered without sorting processing being performed, and values retained by the alpha buffer are used as alpha values of the plurality of objects included in the designated object. Then, shading processing is applied. Thus, even simple processing without sorting processing can make image representation without losing the transparency of parts where a feeling of transparency is more important and with natural shading in dense and shaded parts.

As a result, an image including a large amount of fine objects for which a processing load tends to increase, such as hair or the like, in particular, can be displayed with good responsiveness and with high quality. Incidentally, SSAO is used as shading processing in the present embodiment. SSAO is useful especially in that SSAO is easily applicable as postprocessing after rendering. However, another method may be applied as long as the method is a shading processing technology capable of providing smooth changes in tone from a part of high density to a part of low density in an object.

Second Embodiment

In a present embodiment, a photographed image or a rendered image is subjected to manipulation using projection and depression information of a subject or an object. Here, information on a depression of an object can be translated into a "degree of occlusion" in the first embodiment.

Figure 10:
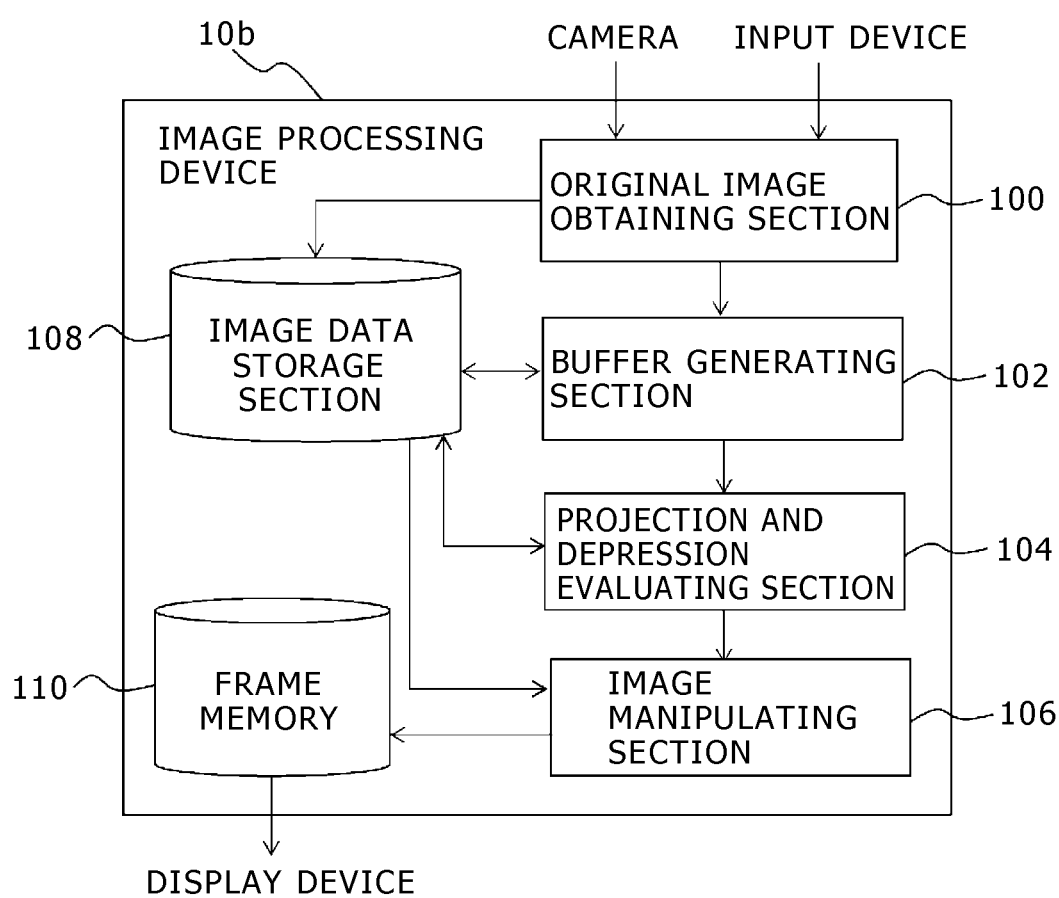
FIG. 10 is a functional block diagram of an image processing device in a second embodiment.

FIG. 10 is a functional block diagram of an image processing device in the present embodiment. Incidentally, the internal circuit configuration of the image processing device is similar to that of FIG. 1. The image processing device 10b includes: an original image obtaining section 100 that obtains an original image to be manipulated; an image data storage section 108 that stores the data of the image and generated intermediate data; a buffer generating section 102 that generates a Z-buffer and a normal buffer for a subject or an object in the original image; a projection and depression evaluating section 104 that converts the projections and depressions of the subject or the object into a numerical form; an image manipulating section 106 that subjects the image to a predetermined manipulation on the basis of the projections and depressions of the subject; and a frame memory 110 that stores the data of the image to be displayed.

The original image obtaining section 100 obtains the data of an original image to be manipulated from a camera connected to the image processing device 10b. Alternatively, the original image obtaining section 100 may be provided with similar functions to those of the information processing section 32 and the image processing section 34 in the first embodiment, so that an image obtained by rendering objects in a virtual three-dimensional space is set as an original image. In this case, the functions of the alpha buffer generating block 38 do not need to be provided.

The buffer generating section 102 obtains the position in a depth direction of a subject from the camera, and generates a Z-buffer and a normal buffer on the basis of the position in the depth direction of the subject. For example, the camera is a stereo camera, and the original image obtaining section 100 obtains the data of stereo images obtained by simultaneously photographing a photographing target from a left position and a right position having a known interval therebetween. Then, on the basis of the stereo images, the buffer generating section 102 calculates the position in the depth direction of the subject by an ordinary method such as stereo matching or the like, and generates a Z-buffer. In this case, the original image to be manipulated may be one of the stereo images.

Alternatively, a camera of a reference light irradiation type using infrared rays or the like may be provided separately from the camera that photographs the original image, and information on the distance of the subject on the basis of a reflection time may be obtained by the original image obtaining section 100 so that a Z-buffer is generated. Then, a normal buffer can be generated by obtaining the slope of the surface of the subject on the basis of three-dimensional coordinates including the position in the depth direction of the subject and the position of the subject on an image plane, which coordinates are indicated by the Z-buffer, and calculating a normal to the slope.

The projection and depression evaluating section 104 converts the projections and depressions of the subject into numerical values and evaluates the projections and depressions of the subject, using the Z-buffer and the normal buffer generated by the buffer generating section 102. The numerical values are obtained by performing calculation equivalent to that of the evaluation value A indicating a degree of occlusion, which evaluation value A has been described in the first embodiment. In the present embodiment, however, not only depressions of an object but also projections of the object are converted into numerical values. In this case, an evaluation value B that approaches zero as a projection projects more is given by the following equation.

$$B \approx \max\left(0, 1 - \frac{2\sigma}{s} \cdot \sum_{i=1}^{s} \frac{\max(0, -\vec{v_i} \cdot \hat{n} + z_c\beta)}{\vec{v_i} \cdot \vec{v_i} + \epsilon}\right)^k \quad [\text{Math. 3}]$$

Each parameter is the same as for the evaluation value A. On the other hand, when an inner product of a vector $v_i$ from a target point to an ith sample point and the normal vector n of the target point is negative, the larger the absolute value of the inner product, the larger an obtuse angle formed between the normal vector n and the reference vector $v_i$, that is, the steeper the projection of the target point. Hence, an equivalent evaluation value B for the projection can be defined by multiplying the inner product in the evaluation value A by −1. The projection and depression evaluating section 104 generates at least one of a depression evaluation value buffer indicating the evaluation value A and a projection evaluation value buffer indicating the evaluation value B for each pixel in the image plane. Which of the evaluation value buffers to generate is determined according to a purpose of image manipulation.

The image manipulating section 106 subjects the original image to a predetermined manipulation using the evaluation value buffer according to the purpose of the manipulation. For example, a depression of a subject or a portion of dense objects in a photographed image is shaded. Thus, details of the portion tend to be blurred or difficult to see because the portion is dark. Accordingly, the smaller the evaluation value A of a depression is, that is, the more conspicuous the depression is, the larger the luminance value of the initial original image is set. This enables luminance values to be partly corrected, and can therefore make only a dark portion look brighter without changing the luminance of a region that originally looks bright. The data of the thus manipulated image is output to the frame memory 110, and thereby displayed on a display device. Alternatively, the data of the thus manipulated image may be stored in the main memory 16 or the storage section 24 to be able to be displayed later.

In addition, the image manipulating section 106 may use the projection evaluation value buffer to increase the luminance of a projection and thereby enhance contrast. Alternatively, utilizing a fact that a projection can be estimated to be a main photographing target such as a person, an animal, an object, or the like, an image may be generated in which the main photographing target is made more conspicuous by applying a post effect that blurs regions other than the projection or darkens the tone of the regions other than the projection. The three-dimensional coordinates of the projection may be fed back to the camera to control the camera such that photographing is performed while the portion considered to be a photographing target is in focus.

In addition, the image manipulating section 106 may recognize the image of a specific subject by a method different from that of the projection and depression evaluating section 104, and limit a region to be manipulated or adjust a degree of manipulation according to a result of the recognition. For example, when an existing face recognition technology is applied, only the face of a person in a region identified as a projection in the projection evaluation value buffer can be extracted. Then, post effect processing as described above can make the face portion conspicuous or make the camera focused on the face portion. Alternatively, a partial adjustment in which even the kind of the subject is taken into consideration can be made such that the face portion is made brighter than other regions, only a depression around the face is made bright, or the depression is made brighter than other depressions in the image. Conversely, a specific subject or a depression around the specific subject may be made darker than other portions, for example.

Without being limited to the face, various subjects having specific shapes, colors, or movements may be recognized by ordinary methods such as pattern matching, motion recognition, and the like. In association with a combination of the region of an image of a specific subject thus recognized and a depression and a projection evaluated by the projection and depression evaluating section 104, a kind of manipulation to be performed and a degree of the manipulation are determined in advance, and stored in a memory within the image manipulating section 106 or the like. Alternatively, the user may be allowed to select the kind of manipulation to be performed and the degree of the manipulation for the above combination.

The operation of the image processing device described thus far will next be described. FIG. 11 is a flowchart of a processing procedure in which the image processing device manipulates an original image. This flowchart is started when the camera starts photographing or information processing for a game or the like is started according to an instruction input by the user. First, the original image obtaining section 100 obtains the data of a photographed image from the camera, or performs information processing and renders a display image (S30). When the photographed image is set as an original image, stereo images are obtained from the camera, or information on a position in a depth direction is directly obtained from a camera of a reference light irradiation type. The obtained data is stored in the image data storage section 108.

Next, the buffer generating section 102 reads necessary data from the image data storage section 108, generates a Z-buffer by performing stereo matching, for example, and generates a normal buffer using a result of the generation of the Z-buffer (S32). Each of the generated buffers is stored in the image data storage section 108. Incidentally, when the original image obtaining section 100 renders a display image, the original image obtaining section 100 may generate each buffer together with the rendering, and store each buffer in the image data storage section 108.

Next, the projection and depression evaluating section 104 reads the Z-buffer and the normal buffer from the image data storage section 108, and generates at least one of a depression evaluation value buffer and a projection evaluation value buffer using the Z-buffer and the normal buffer according to a purpose (S34). The generated evaluation value buffer is stored in the image data storage section 108. The image manipulating section 106 reads the necessary evaluation value buffer and the data of the original image from the image data storage section 108, and subjects the original image to a predetermined manipulation on the basis of the values of the evaluation value buffer (S36). The manipulation performed in this step may be set in advance within the image processing device, or may be specified by the user.

In addition, as a preprocessing before S36, the image manipulating section 106 may determine whether or not the manipulation is necessary. For example, the region of a depression is detected from the depression evaluation value buffer, and it is determined that a manipulation for increasing luminance is necessary when the luminance of the region in the original image is equal to or lower than a threshold value or a difference of the luminance of the region from the luminance of another region is equal to or more than a threshold value, for example. In such a case, a criterion for determining whether the manipulation is necessary or unnecessary is determined in association with the manipulation to be performed, and stored in an internal memory not shown in the figures or the like.

The data of the manipulated image is stored in the frame memory 110, and output to the display device via the output section 26 in appropriate timing, whereby the image is displayed (S38). Until the user performs an input for ending the photographing or the display, or until a need to end the display arises after completion of the display to an end, for example (N in S40), the photographing is continued or a user operation is received, and the processing from S30 to S38 is repeated. Thereby image display changed according to the movement of the subject or the viewpoint is made. Then, when a need to end the display arises, the processing is ended (Y in S40).

FIG. 12 shows a comparison between an original image 120a photographed by a camera and an image 122a manipulated by the present embodiment. In the present example, an armchair placed in front of a window is a main photographing target, and a depressed space enclosed by the back and sides of the chair, the undersurface of the seat of the chair, and a floor is formed on the lower side of the seat of the chair. The same figure also shows magnified images 120b and 122b of the depressed space in the original image 120a and the image 122a after the manipulation. In the original images 120a and 120b, the depressed space appears to be darker than the other spaces due partly to the effect of incident light from the window and the like. The images 122a and 122b after the manipulation result from a correction that brightens the depressed space in the original image 120a. It is shown that this manipulation increases the brightness of only the depressed space without changing the brightness of the image as a whole.

Incidentally, as a method for brightening the depression, the color space of the original image may be converted into YCbCr, and the value of Y (luminance) may be increased by a larger amount of increase for a smaller evaluation value A. Alternatively, the color itself may be adjusted with the RGB color space unchanged. At this time, a rule for changing the value of Y or RGB with respect to a change in the evaluation value A is set in advance. A gamma correction filter may be used. A degree of brightening, that is, an amount of change in the value of Y or RGB may be set in advance on the device side, or may be allowed to be adjusted by the user according to the contents of the image or a preference.

Alternatively, a histogram of the image as a whole may be obtained, and the amount of change may be determined according to the tone of the image as a whole. For example, a histogram of Y-values is obtained, and the half of an average value is added to the Y-values of the depression. In addition, the amount of change in the Y-value may be changed according to a spatial change in the evaluation value A, or a threshold value may be provided to the evaluation value A to limit the region of the depression and the region may be changed by the same amount of change. The same is true for the manipulation of a projection using the evaluation value B.

According to the present embodiment described above, a Z-buffer and a normal buffer are generated by measuring, or obtaining at a time of rendering, the positions in a depth direction of a subject or an object. Then, these buffers are used to calculate evaluation values in an image plane which evaluation values indicate a depression or a projection formed by the shape of the subject itself or the arrangement of a plurality of subjects. A photographed image or a rendered image is subjected to manipulation according to a result of the calculation. It is thereby possible to brighten a place that appears to be dark because the place is a depressed space, or enhance contrast by projections and depressions. In addition, a projection being treated as a main photographing target or an object, blurring processing can be performed so as to make the portion more conspicuous than other portions, or the camera can be focused on the portion. The calculation of the evaluation values and the manipulation of the image can be performed as postprocessing. The present embodiment is therefore expected to be applied to a wide range of fields irrespective of whether an image to be manipulated is a photographed image or a rendered image.

The present invention has been described above on the basis of embodiments thereof. The foregoing embodiments are illustrative, and it is to be understood by those skilled in the art that combinations of constituent elements and processing processes of the embodiments are susceptible of various modifications and that such modifications also fall within the scope of the present invention.

For example, in the second embodiment, the functions of the image processing device 10b may be provided to the main body of the camera. In this case, a mode is conceivable in which the user checks a photographed still image or a photographed moving image on a display device included in the camera on the spot, makes the camera perform manipulation processing on a depression or a projection when the user feels a need for the manipulation processing, and then stores final image data in an internal storage device. The camera itself may determine whether the manipulation is necessary or unnecessary. Alternatively, the camera may detect a projection, and automatically focus on the projection or narrow the focus to the projection.

REFERENCE SIGNS LIST

10 Image processing device, 12 CPU, 14 GPU, 16 Main memory, 32 Information processing section, Image processing section, 36 Image data storage section, 38 Alpha buffer generating block, 40 Alpha buffer, 42 Rendering block, 44 Shading processing block, 100 Original image obtaining section, 102 Buffer generating section, 104 Projection and depression evaluating section, 106 Image manipulating section, 108 Image data storage section.

INDUSTRIAL APPLICABILITY

As described above, the present invention is applicable to information processing devices such as computers, image processing devices, image display devices, game machines, and the like.

The invention claimed is:

1. An image processing device for rendering an image including an object to which an alpha value indicating transparency is set, the image processing device comprising:
a rendering block rendering, in an image plane, the object in a space to be rendered according to a viewpoint;
a shading processing block obtaining a distribution of evaluation values of degrees of occlusion, the evaluation values being able to be calculated by estimating the degrees of occlusion of ambient light in the space to be rendered, for an image rendered by the rendering block, shading the rendered image on a basis of the distribution, and storing resulting data in a memory; and
an alpha buffer generating block generating a distribution of alpha values en bloc for a designated object by determining the alpha values for a plurality of positions within a rendering region of the designated object in the image plane using alpha values respectively set to a plurality of objects designated as the designated object in advance among objects to be rendered,
wherein when the rendering block renders the designated object, the rendering block uses the alpha values of the corresponding positions in the image plane, the alpha values being determined by the alpha buffer generating block, and
wherein when there are a plurality of objects whose rendering regions include a position for which to determine an alpha value in the designated object, the alpha buffer generating block determines the alpha value of the position on a basis of a total product of alpha values of these objects.

2. The image processing device according to claim 1, further comprising
an information processing section determining a change in the viewpoint according to an operation by a user, and notifying the change in the viewpoint to the rendering block and the shading processing block,
wherein the rendering block updates a rendering result according to the notified change in the viewpoint, and
the shading processing block updates the distribution of the evaluation values according to the notified change in the viewpoint, and applies shading on a basis of the updated distribution.

3. The image processing device according to claim 1, wherein for a plurality of objects designated in advance among objects to be rendered, the rendering block does not perform sorting processing for obtaining a permutation of the plurality of objects, the permutation being in a depth direction from the viewpoint.

4. An image processing method of an image processing device rendering an image including an object to which an alpha value indicating transparency is set, the image processing method comprising:
rendering, in an image plane, the object in a space to be rendered according to a viewpoint after reading model data of the object from a storage device;
obtaining a distribution of evaluation values of degrees of occlusion, the evaluation values being able to be calculated by estimating the degrees of occlusion of ambient light in the space to be rendered, for a rendered image;
shading the rendered image on a basis of the distribution of the evaluation values; and
storing data of the shaded image in a memory; and
generating a distribution of alpha values en bloc for a designated object by determining the alpha values for a plurality of positions within a rendering region of the designated object in the image plane using alpha values respectively set to a plurality of objects designated as the designated object in advance among objects to be rendered, wherein when the rendering step renders the designated object, the alpha values of the corresponding positions in the image plane are used, the alpha values being determined by the generating step, and wherein when there are a plurality of objects whose rendering regions include a position for which to determine an alpha value in the designated object, the generating step includes determining the alpha value of the position on a basis of a total product of alpha values of these objects.

5. A non-transitory, computer readable storage medium containing a computer program for making a computer render an image including an object to which an alpha value indicating transparency is set, the computer program, comprising:

rendering, in an image plane, the object in a space to be rendered according to a viewpoint after reading model data of the object from a storage device;

obtaining a distribution of evaluation values of degrees of occlusion, the evaluation values being able to be calculated by estimating the degrees of occlusion of ambient light in the space to be rendered, for a rendered image;

shading the rendered image on a basis of the distribution of the evaluation values; and storing data of the shaded image in a memory; and generating a distribution of alpha values en bloc for a designated object by determining the alpha values for a plurality of positions within a rendering region of the designated object in the image plane using alpha values respectively set to a plurality of objects designated as the designated object in advance among objects to be rendered, wherein when the rendering step renders the designated object, the alpha values of the corresponding positions in the image plane are used, the alpha values being determined by the generating step, and wherein when there are a plurality of objects whose rendering regions include a position for which to determine an alpha value in the designated object, the generating step includes determining the alpha value of the position on a basis of a total product of alpha values of these objects.

6. An image processing device for rendering an image including an object to which an alpha value indicating transparency is set, the image processing device comprising:

a rendering block rendering, in an image plane, the object in a space to be rendered according to a viewpoint; and a shading processing block obtaining a distribution of evaluation values of degrees of occlusion, the evaluation values being able to be calculated by estimating the degrees of occlusion of ambient light in the space to be rendered, for an image rendered by the rendering block, shading the rendered image on a basis of the distribution, and storing resulting data in a memory, wherein for a plurality of objects designated in advance among objects to be rendered, the rendering block does not perform sorting processing for obtaining a permutation of the plurality of objects, the permutation being in a depth direction from the viewpoint.

7. An image processing method of an image processing device rendering an image including an object to which an alpha value indicating transparency is set, the image processing method comprising:

rendering, in an image plane, the object in a space to be rendered according to a viewpoint after reading model data of the object from a storage device;

obtaining a distribution of evaluation values of degrees of occlusion, the evaluation values being able to be calculated by estimating the degrees of occlusion of ambient light in the space to be rendered, for a rendered image;

shading the rendered image on a basis of the distribution of the evaluation values; and storing data of the shaded image in a memory, wherein for a plurality of objects designated in advance among objects to be rendered, the rendering block does not perform sorting processing for obtaining a permutation of the plurality of objects, the permutation being in a depth direction from the viewpoint.

8. A non-transitory, computer readable storage medium containing a computer program for making a computer render an image including an object to which an alpha value indicating transparency is set, the computer program, comprising:

rendering, in an image plane, the object in a space to be rendered according to a viewpoint after reading model data of the object from a storage device;

obtaining a distribution of evaluation values of degrees of occlusion, the evaluation values being able to be calculated by estimating the degrees of occlusion of ambient light in the space to be rendered, for a rendered image;

shading the rendered image on a basis of the distribution of the evaluation values; and storing data of the shaded image in a memory, wherein for a plurality of objects designated in advance among objects to be rendered, the rendering block does not perform sorting processing for obtaining a permutation of the plurality of objects, the permutation being in a depth direction from the viewpoint.

* * * * *